(12) United States Patent
Roy et al.

(10) Patent No.: US 6,216,409 B1
(45) Date of Patent: Apr. 17, 2001

(54) CLADDING PANEL FOR FLOORS, WALLS OR THE LIKE

(76) Inventors: Valerie Roy, 13, rue du College, 89160 Ancy le Franc; Alain Roy, 4, Square Raphael, 89600 Saint Florentin, both of (FR)

( * ) Notice: Subject to any disclaimer, the term of this patent is extended or adjusted under 35 U.S.C. 154(b) by 0 days.

(21) Appl. No.: 09/235,758

(22) Filed: Jan. 25, 1999

(30) Foreign Application Priority Data

Nov. 9, 1998 (FR) .................................... 98 14074

(51) Int. Cl.⁷ ...................................................... E04B 2/08
(52) U.S. Cl. ........................ 52/589.1; 52/592.1; 52/592.4; 52/588.1
(58) Field of Search .............................. 52/592.1, 589.1, 52/588.1, 592.4, 539, 390, 391, 392, 578

(56) References Cited

U.S. PATENT DOCUMENTS

| | | | |
|---|---|---|---|
| 713,577 | * 11/1902 | Wickham | ................................ 52/467 |
| 2,398,632 | * 4/1946 | Frost et al. | ........................ 428/309.9 |
| 2,430,200 | 11/1947 | Wilson . | |
| 2,740,167 | 4/1956 | Rowley . | |
| 3,100,556 | 8/1963 | Ridder . | |
| 3,182,769 | 5/1965 | Ridder . | |
| 3,203,149 | 8/1965 | Soddy . | |
| 3,347,048 | * 10/1967 | Brown et al. | ................... 52/592.4 X |
| 3,411,261 | 11/1968 | Soddy . | |
| 3,460,304 | * 8/1969 | Braeuninger et al. | .............. 52/588.1 |
| 3,555,762 | 1/1971 | Costanzo, Jr. . | |
| 3,714,747 | * 2/1973 | Curran | .............................. 52/309.2 |
| 3,768,846 | 10/1973 | Hensley et al. . | |
| 4,099,358 | 7/1978 | Compaan . | |
| 4,299,070 | * 11/1981 | Oltamanns et al. | .............. 52/309.11 |
| 4,561,233 | 12/1985 | Harter et al. . | |
| 4,703,597 | 11/1987 | Eggemar . | |
| 4,769,963 | 9/1988 | Meyerson . | |
| 4,845,907 | 7/1989 | Meek . | |
| 4,905,442 | 3/1990 | Daniels . | |
| 5,165,816 | * 11/1992 | Parasin | ................................ 403/334 |
| 5,295,341 | 3/1994 | Kajiwara . | |
| 5,349,796 | 9/1994 | Meyerson . | |
| 5,502,939 | * 4/1996 | Zadok et al. | ........................ 52/309.9 |
| 5,570,554 | * 11/1996 | Searer | .................................... 52/539 |
| 5,706,621 | 1/1998 | Pervan . | |
| 5,797,237 | * 8/1998 | Finkell, Jr. | .......................... 52/589.1 |
| 5,860,267 | 1/1999 | Pervan . | |
| 6,006,486 | * 12/1999 | Moriau et al. | ...................... 52/589.1 |

FOREIGN PATENT DOCUMENTS

| | | |
|---|---|---|
| 1 534 278 | 12/1973 | (DE) . |
| 30 41 781 | 6/1982 | (DE) . |
| 35 44 845 | 6/1987 | (DE) . |
| 40 02 547 | 8/1991 | (DE) . |
| 42 42 530 | 6/1994 | (DE) . |
| 297 10 175 U | 9/1997 | (DE) . |
| 0 698 162 | 7/1998 | (EP) . |
| 1245055 | 9/1960 | (FR) . |
| 1 293 043 | 12/1962 | (FR) . |
| 424 057 | 2/1935 | (GB) . |
| 816 243 | 7/1959 | (GB) . |
| 1 430 423 | 3/1976 | (GB) . |
| 2 117 813 | 10/1983 | (GB) . |
| 2 126 106 | 3/1984 | (GB) . |
| 2 256 023 | 11/1992 | (GB) . |
| 57-119056 | 7/1982 | (JP) . |
| 3-169967 | 7/1991 | (JP) . |
| 6 504 640 | 2/1966 | (NL) . |

* cited by examiner

*Primary Examiner*—Beth A. Stephan
*Assistant Examiner*—Brian Glessner
(74) *Attorney, Agent, or Firm*—Young & Thompson

(57) ABSTRACT

In cross section, the tongue of a cladding panel has on its bottom face and the bottom lip of the groove has on its top face, respectively, a second raised portion projecting downward and a complementary second recess shaped so that the second raised portion of the tongue on one panel interengages with the second recess of the groove of an adjacent panel when one panel is turned relative to the other, to form second element of clipping the tongue into the groove.

11 Claims, 2 Drawing Sheets

CLADDING PANEL FOR FLOORS, WALLS OR THE LIKE

BACKGROUND OF THE INVENTION

The present invention concerns a cladding panel for floors, walls or the like having, on at least two of its opposite edges, on one edge a longitudinal tongue and on the other edge a longitudinal groove between a top lip and a bottom lip, the tongue and the groove being formed within the thickness of the panel and having respective shapes in cross section complementary to each other so that the tongue of one panel is adapted to be inserted into the groove of an adjacent panel by rotating one panel relative to the other so that the shaped portions of the tongue inter-engage with the shaped portions of the groove to oppose withdrawal of one panel relative to the other in a direction perpendicular to said sides and parallel to the faces of said panels, the tongue having in cross section, starting from its end and on its bottom face, a substantially circular first section followed by a downwardly projecting raised portion and the bottom lip having on its top face, starting from the back of the groove, a first section on which the first section of the tongue rolls and slides, followed by a recess complementary to said raised portion, followed by a bead delimiting said recess, the bottom lip being adapted to bend elastically to allow said raised portion to pass over said bead and then to resume substantially its unstressed position to retain the tongue in the groove.

DESCRIPTION OF THE RELATED ART

A panel of the above kind is known per se, in particular from WO97/47834, which describes fiber-based high-density or medium-density composite panels having standardized dimensions and a thickness in the order of 8 mm, for example.

Two adjacent panels can be clipped together either by forcing one panel toward the other panel or by turning one panel relative to the other one. In both cases the bottom lip flexes elastically to a sufficient degree to allow the insertion of the tongue into the groove and the raised pattern on the tongue to pass over the bead at the end of the bottom lip.

In the position with two adjacent panels clipped together the section joining the recess to the bead bears elastically on the corresponding section of the raised pattern on the bottom face of the tongue to press the two panels against each other both in the direction perpendicular to the two main faces of the panels and in the direction parallel to said two faces of the panels and contained in a cross-sectional plane, i.e. a plane perpendicular to the respective sides of the panels.

This elastic loading occurring simultaneously in two perpendicular directions is nevertheless unsatisfactory in that the component of this loading in each of the two directions concerned is necessarily a relatively small fraction of the loading force.

What is more, the resulting dry assembly, without glue, would not appear to offer an entirely satisfactory seal against ingress of dust and liquids, in particular water.

SUMMARY OF THE INVENTION

The aim of the present invention is therefore to propose a cladding panel of the aforementioned type shaped to create predetermined loads in the aforementioned two directions between two adjacent panels combined with an improved seal against dust and liquids.

In accordance with the present invention, the cladding panel of the aforementioned type is characterized in that, in cross section, the tongue has on its bottom face and the bottom lip of the groove has on its top face, respectively, a second raised portion projecting downward and a complementary second recess shaped so that the second raised portion of the tongue of one panel inter-engages with the second recess of the groove of an adjacent panel when one panel is turned relative to the other, so as to form second means of clipping the tongue into the groove.

The second clipping means create a complementary contact area between the two panels which improves the seal against dust and against liquids.

What is more, the second raised pattern is offset laterally relative to the first raised pattern in a cross-sectional plane of the assembly between the two panels. Accordingly, the contact surfaces respectively corresponding to the two raised patterns and to the two recesses have different orientations which can be chosen to emphasize loading of the two panels toward each other either in the direction perpendicular to the main faces of the two panels or in the other aforementioned direction with the aim of bringing the two panels together parallel to their main faces.

Conversely, the combination of the first and second clipping means greatly increases the resistance of the assembly of two adjacent panels in accordance with the invention to pulling apart parallel to the other aforementioned direction.

In another version, the invention also concerns a cladding assembly for surfaces of the floor, wall or like type made up of adjacent panels assembled together wherein the panels are panels in accordance with the first version of the invention.

Other features and advantages of the present invention will become apparent in the course of the following detailed description.

BRIEF DESCRIPTION OF THE DRAWINGS

In the accompanying drawings, which are provided by way of non-limiting example only.

DESCRIPTION OF THE PREFERRED EMBODIMENT

Figure 1:
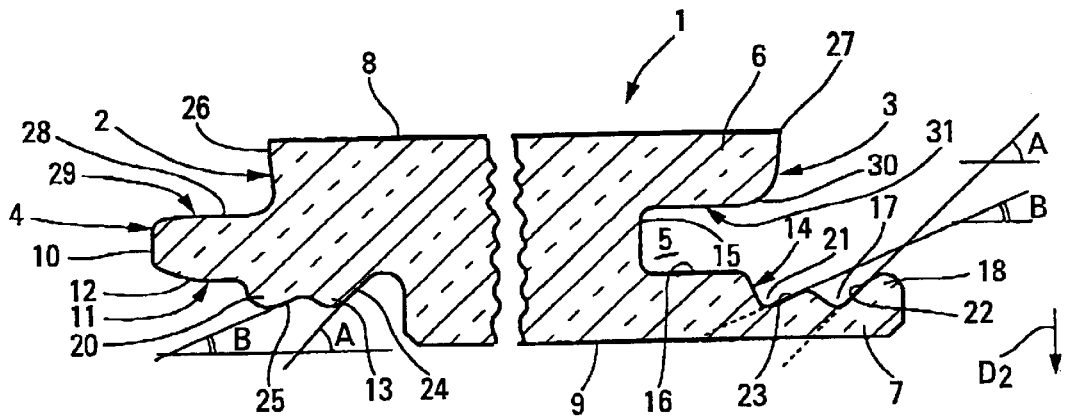
FIG. 1 is a diagrammatic view in cross section of one embodiment of a panel in accordance with the present invention.

In the embodiment shown in the FIGS. the cladding panel 1 for floors, walls or the like has, on at least two of its opposite edges 2, 3, a longitudinal tongue 4 on an edge 2 and a longitudinal groove 5 between a top lip 6 and a bottom lip 7 on the other edge 3.

Figure 3:
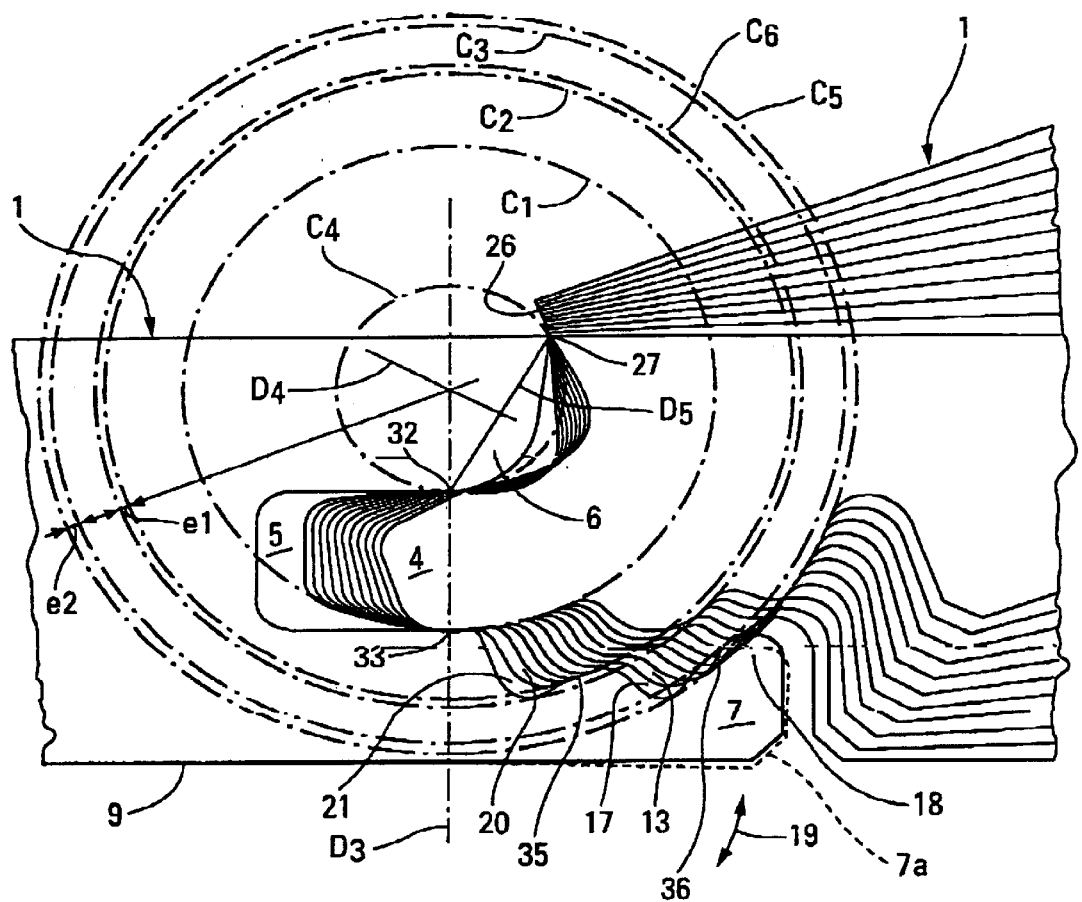
FIG. 3 is a diagrammatic view to a larger scale similar to FIG. 2 showing the various phases of assembling two adjacent panels in the embodiment from FIG. 1.

The tongue 4 and the groove 5 are formed within the thickness of the panel 1 and have respective shapes in cross section, as shown in FIG. 1, which are complementary to each other so that the tongue 4 of a panel 1 is adapted to be inserted into the groove 5 of an adjacent panel 1 by rotating one panel relative to the other, as shown diagrammatically in FIG. 3.

Figure 2:
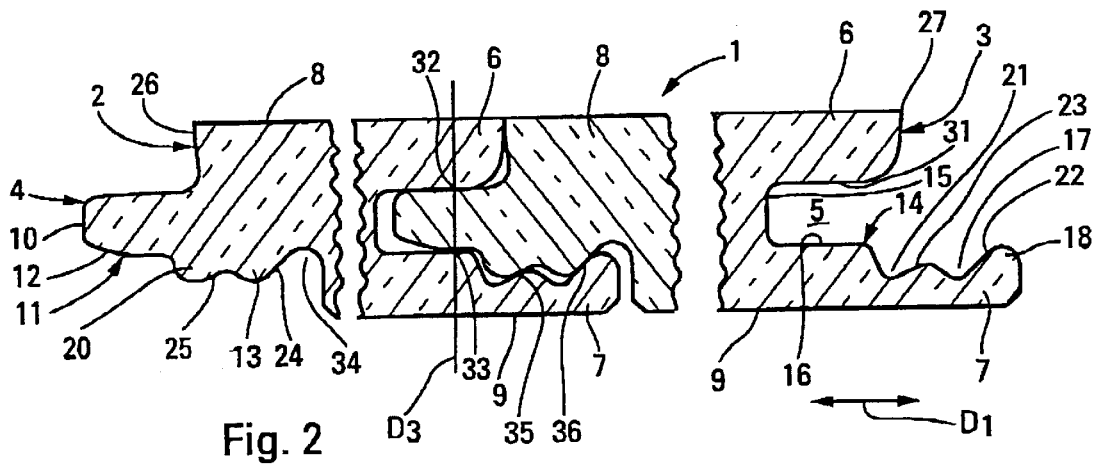
FIG. 2 is a view similar to FIG. 1 showing the assembly of two adjacent panels in the embodiment shown in FIG. 1.

In this way the shaped portions of the tongue 4 interengage with the shaped portions of the groove 5 to prevent withdrawal of one panel 1 from the other in a direction $D_1$, perpendicular to the sides 2, 3 and parallel to the main faces 8, 9 of the panels 1 (see FIG. 2).

In the following description with reference to the figures., it is supposed that the panels 1 are disposed substantially horizontally to form a floor. The description will therefore refer to the top face, which is in fact adapted to constitute the visible face, and the bottom face, which is in fact adapted to constitute the hidden face, of a panel. By analogy, the description will refer to the top face and/or bottom face of the tongue 4 or to the top lip 6 or to the bottom lip 7.

This does not mean that the cladding panels in accordance with the present invention cannot be disposed vertically to form walls, with the visible face on the outside and the other face hidden, or horizontally to form ceilings, with the visible face downward.

In a manner that is known per se, the bottom lip 7 is longer than the top lip 6 so that a point load acting in the vicinity of contiguous edges 3, 2 of two adjacent panels 1 is transmitted to a support (not shown) without risk of deforming or breaking the top lip 6 and/or the tongue 4.

In cross section the tongue 4 has, starting from its free end 10 and on its bottom face 11, a substantially circular first section 12 followed by a downwardly projecting raised portion 13.

The bottom lip 7 has on its top face 14, starting from the back 15 of the groove 5, a first section 16 on which the first section 12 of the tongue 4 rolls and slides followed by a recess 17 complementary to the raised portion 13 of the tongue 4 followed by a bead 18 delimiting the recess 17.

As shown diagrammatically in FIG. 3, the bottom lip 7 is adapted to bend elastically outward, as symbolized by the arrow 19, to allow the raised portion 13 to pass over the bead 18 and then to resume substantially its unstressed position to retain the tongue 4 in the groove 5.

In accordance with the invention, and as shown in cross section in FIGS. 1, 2 and 3, the tongue 4 has on its bottom face 11 and the bottom lip 7 of the groove 5 has on its top face 14, respectively, a second raised portion 20 projecting downward in the direction $D_2$ and a complementary second recess 21 shaped so that the second raised portion 20 of the tongue 4 of a panel 1 interengages with the second recess 21 of the groove 5 of an adjacent panel when one panel 1 is turned relative to the other, so as to form a second means of clipping the tongue 4 into the groove 5.

The FIGS. show that the second raised portion 20 is between the section 12 and the first raised portion 13 on the bottom face 11 of the tongue 4. The transition between the section 12 and the raised portion 20 is at a point of inflection 32, as explained hereinafter, the plane tangential at this point 32 to the bottom face 11 of the tongue 4 being parallel to the main faces 8, 9 of the panel 1.

Similarly, the second recess 21 on the top face 14 of the bottom lip 7 is between the section 16, which is parallel to the main faces 8, 9 of the panel 1, and the first recess 17.

The back of the second recess 21 is not nearer the face 9 than the back of the first recess 17, so as not to constitute an area with lower resistance to pulling out of the bottom lip 7.

FIG. 3 in particular shows that the top face 14 of the bottom lip 7 is shaped so that the first section 16 of that face 14 and the sections 22, 23 respectively constituting the exterior sides 22, 23 of the two recesses 17, 21 are, when unstressed, respectively substantially tangential at points 33, 35, 36 to three concentric circles $C_1$, $C_2$, $C_3$ having their common center M inside the top lip 6.

Similarly, the bottom face 11 of the tongue 4 is shaped so that the first section 12 and the sections 24, 25 respectively constituting the interior sides 24, 25 of the two raised portions 13, 20 are, when unstressed, respectively substantially tangential to three concentric circles $C_1$, $C_2$, $C_3$ having their common center M above the tongue 4.

In the positions of two adjacent panels 1 during assembly and when assembled shown in FIG. 3, the three concentric circles $C_1$, $C_2$, $C_3$ of the groove 5 of a first panel 1 and of the groove 4 of the other panel 1 are substantially coincident.

In each of the positions shown in FIG. 3 the lateral face 26 above the tongue 4 on the edge 2 of the panel 1 being fitted is pressed against the top corner 27 of the edge 3 of the panel 1 already in place, shown on the left in the FIG.

FIG. 3 also shows that the substantially rectilinear section 28 of the top face 29 of the tongue 4 parallel to the main faces 8 and 9 of the panel 1 remains tangential during its movement to a circle $C_4$ having the same center M as the concentric circles $C_1$, $C_2$, $C_3$. The section 30 of the bottom face 31 of the top lip 6 along which the section 28 slides is therefore substantially the shape of the corresponding section of the circle $C_4$.

To assure good contact between the tongue 4 and the bottom lip 7 and a good seal against dust and liquids, the bottom face 11 of the tongue 4 has a first circular section 12 having a radius greater than the radius of the corresponding concentric circle $C_1$.

FIGS. 1 to 3 show that the exterior sides 22, 23 of the first and second recesses 17, 21 and the interior sides 24, 25 of the first and second raised portions 13, 20 are substantially rectilinear and respectively form substantially equal first angles A and substantially equal section angles B with the bottom face 9 of the corresponding panel 1.

The angles A and B define the respective positions of the points of contact 35 and 36 on the circles $C_3$ and $C_2$.

The first angles A are advantageously in the range approximately 20° to approximately 30°, for example approximately 25°.

The second angles B are advantageously in the range approximately 45° to approximately 55°, for example approximately 50°.

The bottom face 31 of the top lip 6 and the top face 14 of the bottom lip 7 are parallel to the main faces 8, 9 of the panel 1 at the respective points of contact 32, 33 with the corresponding faces 29, 11 of the tongue 4 in the assembled position.

The center M of the concentric circles $C_1$, $C_2$, $C_3$, $C_4$ is therefore on the straight line $D_3$ through the points 32, 33 and perpendicular to the main faces 8, 9 of the panel 1.

It also follows from the above that the center M of the concentric circles $C_1$ through $C_6$ is also on the midline $D_4$ of the segment $D_5$ joining the points 27 and 32, which defines the position of the point M in the cross section of the top lip 6.

Figure 4:
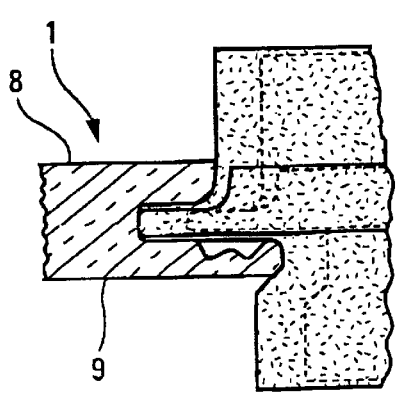
FIGS. 4 and 5 are diagrammatic views showing how the walls of the groove are milled to shape in the embodiment from FIG. 1.

As shown diagrammatically in FIG. 4, the parallel relationship of the faces 31 and 14 delimiting the groove 5 and the main faces 8, 9 of each panel 1 means that the groove 5 and the edge 3 can be formed in a single conventional milling operation using two shaped milling tools. To this end the bead 18 has a height at most equal to that of the bottom lip 7 at the level of the top face 14 thereof.

Figure 5:
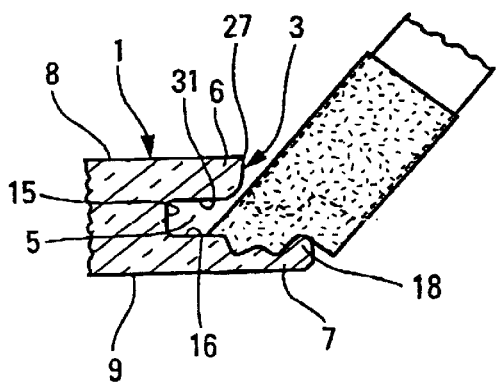

Moreover, and as shown diagrammatically in FIG. 5, the profile of the two recesses 17, 21 and of the bead 18 can also be obtained by a single milling operation.

Figure 6:
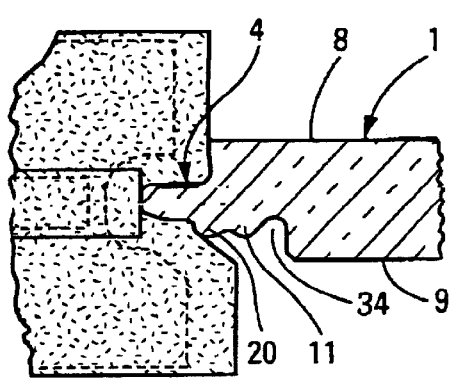
FIGS. 6 and 7 are diagrammatic views showing how the walls of the tongue are milled in the embodiment from FIG. 1.
Figure 7:
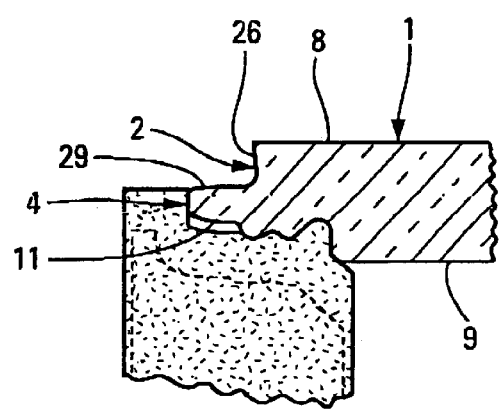

Similarly, and as shown diagrammatically in FIGS. 6 and 7, the profile of the tongue 4 can be formed in two successive milling operations, a first operation carried out using a combination of two shaped milling tools to form the lateral face 26 of the edge 2 and the end of the tongue 4, with its top face 29 and the circular section 12 of its bottom face 11, and a second operation to form the two raised portions 13, 20 and the recess 34 adapted to receive the bead 18.

FIG. 3 shows that during rotation of the panel 1 during fitting, shown on the right in the figure., the interior sides 24, 25 of the raised portions 13, 20 bear on the exterior sides 22, 23 of the recesses 17, 21 so as to bend the bottom lip 7 in the direction of the arrow 19 as far as the position 7a shown diagrammatically in dashed outline in the figure., the lip resuming substantially its unstressed position after fitting, which substantially constitutes a double clipping of the second panel 1 relative to the first.

Upon this elastic bending of the bottom lip 7 in the direction of the arrow 19, the exterior side 22 of the first recess 17, which is nearer the end of the lip 7, flexes a distance $e_2$ greater than the distance $e_1$ representing the flexing of the side 23 of the second recess 21.

During this rotation the interior sides 24, 25 of the two raised portions 13, 20 remain tangential to circles $C_5$, $C_6$ which have radii respectively increased by $e_2$ and $e_1$ relative to the radii of $C_3$ and $C_2$ before locating against the sides 22, 23 in the assembled position of the two panels 1.

Means for assembling and clipping two adjacent panels have therefore been described which, compared to the prior art, have a greater resistance to pulling apart and provide a better seal to dust and to liquids at the points of contact 35, 36, which are also clamping points.

At these clamping points the top and bottom lips of a panel apply elastic pressure forces to the corresponding shaped portions of the tongue of an adjacent panel to hold the two panels firmly assembled against each other.

The points 32, 33 are points of contact at which a slight clearance is provided to facilitate insertion of the tongue 4 into the groove 5 without significantly deforming the bottom lip 7 at the point 33 so that the elastic deformation of said bottom lip 7 is entirely reserved for the clipping and clamping functions at the points 35 and 36.

The invention achieves this result without reducing the resistance of the panel to pulling apart and without limiting the ease and speed of assembling two adjacent panels together.

Of course, the present invention is not limited to the embodiment just described and many changes and modifications can be made thereto without departing from the scope of the invention.

In particular shapes could be employed comprising three raised portions and three recesses.

What is claimed is:

1. Cladding panel (1) for floors, walls or ceilings having a top face (8) and a bottom face (9) and, on at least two of its opposite edges (2, 3), on one edge (2) a longitudinal tongue (4) and on the other edge (3) a longitudinal groove (5) between a top lip (6) and a bottom lip (7), the tongue (4) and the groove (5) being formed within the thickness of the panel (1) and having respective shapes in cross section complementary to each other so that the tongue (4) of one panel (1) is adapted to be inserted into the groove (5) of an adjacent panel (1) by rotating one panel (1) relative to the other so that the shaped portions of the tongue (4) inter-engage with the shaped portions of the groove (5) to oppose withdrawal of one panel (1) relative to the other in a direction (D1) perpendicular to said edges (2, 3) and parallel to top and bottom faces (8, 9) of said panels (1), the tongue (14) having in cross section, starting from its end (10) and on its bottom face (11), a substantially circular first section (12) followed by a downwardly projecting raised portion (13) and the bottom lip (7) having on its top face (14), starting from the back (15) of the groove (5), a first section (16) on which the first section (12) of the tongue (4) of an adjacent panel (1) is adapted to roll and slide, followed by a recess (17) complementary to said raised portion (13), followed by a bead (18) delimiting said recess (17), the bottom lip (7) being adapted to bend elastically to allow said raised portion (13) to pass over said bead (18) and then to resume substantially its unstressed position to retain the tongue (4) in the groove (5), characterized in that, in cross section, the tongue (4) has on its bottom face (11) and the bottom lip (7) of the groove (5) has on its top face (14), respectively, a second raised portion (20) projecting downward and a complementary second recess (21) shaped so that the second raised portion (20) of the tongue (4) of one panel (1) inter-engages with the second recess (21) of the groove (5) of an adjacent panel (1) when one panel (1) is turned relative to the other, so as to form second means of clipping the tongue (4) into the groove (5), and in that the top face (14) of the bottom lip (7) is shaped so that the first section (16) of the face (14) and the sections (22, 23) respectively constituting the exterior sides (22, 23) of the two recesses (17, 21) are, when unstressed, respectively substantially tangential to three concentric circles (C1, C2, C3) having their common center (M) inside the top lip (6).

2. Cladding panel according to claim 1, characterized in that the bottom face (11) of the tongue (4) is shaped so that the first section (12) and the sections (24, 25) respectively constituting the interior sides (24, 25) of the two raised portions (13, 20) are respectively substantially tangential to three concentric circles (C1, C2, C3) having their common center (M) above the tongue (4).

3. Cladding panel according to claim 2, characterized in that, in positions of two adjacent panels (1) during assembly and when assembled, the three concentric circles (C1, C2, C3) of the groove (5) of a first panel (1) and those of the tongue (4) of the other panel (1) are substantially coincident.

4. Cladding panel according to claim 2, characterized in that the bottom face (11) of the tongue (4) has a circular first section (12) having a radius greater than the radius of the corresponding concentric circle (C1).

5. Cladding panel according to claim 1, characterized in that the exterior sides (22, 23) of the first and second recesses (17, 21) and the interior sides (24, 25) of the first and second raised portions (13, 20) are substantially rectilinear and are at respective substantially equal first angles (A) and substantially equal second angles (B) to the bottom face (9) of the corresponding panel (1).

6. Cladding panel according to claim 5, characterized in that the first angles (A) are in the range approximately 20° to approximately 30°.

7. Cladding panel according to claim 5, characterized in that the second angles (B) are in the range approximately 45° to approximately 55°.

8. Cladding panel according to claim 1, characterized in that the bottom face (31) of the top lip (6) and the top face (14) of the bottom lip (7) are, at respective points of contact (32, 33) with corresponding, faces (29, 11) of the tongue (4) in the assembled position, parallel to the main faces (8, 9) of two adjacent panels (1).

9. Floor, wall or ceiling cladding assembly comprising adjacent panels assembled together, characterized in that it comprises panels according to claim 1.

10. Cladding panel according to claim 6, characterized in that the first angles (A) are approximately equal to 25°.

11. Cladding panel according to claim 7, characterized in that the second angles (B) are approximately equal to 50°.

* * * * *